United States Patent
Yoshida et al.

(10) Patent No.: US 10,662,796 B2
(45) Date of Patent: May 26, 2020

(54) SEAL DEVICE FOR TURBINE, TURBINE, AND THIN PLATE FOR SEAL DEVICE

(71) Applicant: MITSUBISHI HITACHI POWER SYSTEMS, LTD., Kanagawa (JP)

(72) Inventors: Azumi Yoshida, Tokyo (JP); Hidekazu Uehara, Tokyo (JP); Hiroharu Oyama, Kanagawa (JP); Kohei Ozaki, Tokyo (JP); Katsuhisa Hamada, Kanagawa (JP); Hideaki Sugishita, Tokyo (JP); Toyoharu Nishikawa, Tokyo (JP); Yoshihiro Kuwamura, Tokyo (JP); Kohei Hatano, Tokyo (JP); Keisuke Matsuyama, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 2 days.

(21) Appl. No.: 15/550,891

(22) PCT Filed: Feb. 9, 2016

(86) PCT No.: PCT/JP2016/053801
§ 371 (c)(1),
(2) Date: Aug. 14, 2017

(87) PCT Pub. No.: WO2016/132966
PCT Pub. Date: Aug. 25, 2016

(65) Prior Publication Data
US 2018/0045065 A1 Feb. 15, 2018

(30) Foreign Application Priority Data

Feb. 20, 2015 (JP) .................... 2015-031944

(51) Int. Cl.
*F01D 11/02* (2006.01)
*F01D 11/12* (2006.01)
(Continued)

(52) U.S. Cl.
CPC ............. *F01D 11/02* (2013.01); *F01D 11/12* (2013.01); *F02C 7/28* (2013.01); *F16J 15/20* (2013.01);
(Continued)

(58) Field of Classification Search
CPC .......... F05B 2240/572; F05B 2240/571; F01D 11/001; F16J 15/3292; F05D 2240/57; F05D 2240/59; F02C 7/28
(Continued)

(56) References Cited

U.S. PATENT DOCUMENTS 6,343,792 B1 * 2/2002 Shinohara ............ F01D 11/001
277/345
6,874,788 B2 * 4/2005 Kono ................... F16J 15/3292
277/355

(Continued)

FOREIGN PATENT DOCUMENTS

EP  2 827 030      1/2015
JP  2002-13647     1/2002
(Continued)

OTHER PUBLICATIONS

International Search Report dated May 10, 2016 in International (PCT) Application No. PCT/JP2016/053801.
(Continued)

*Primary Examiner* — Eugene G Byrd
(74) *Attorney, Agent, or Firm* — Wenderoth, Lind & Ponack, L.L.P.

(57) ABSTRACT

A seal device for a turbine includes: a plurality of thin plates arranged along an outer peripheral surface of the rotor, each of the thin plates including a root portion disposed on an outer side in a radial direction of the rotor and supported on a stationary part of the turbine and a tip portion disposed on an inner side in the radial direction of the rotor and having
(Continued)

a tip surface facing the outer peripheral surface of the rotor. Each of the thin plates is configured such that a width direction of the thin plate is parallel to an axial direction of the rotor at a side of the root portion, and the tip portion of each of the thin plates is configured such that an end on a side of the high-pressure space is positioned downstream of another end on a side of the low-pressure side.

9 Claims, 10 Drawing Sheets

(51) Int. Cl.
F16J 15/44 (2006.01)
F16J 15/22 (2006.01)
F02C 7/28 (2006.01)
F16J 15/20 (2006.01)
(52) U.S. Cl.
CPC .............. F16J 15/22 (2013.01); F16J 15/44 (2013.01); F05D 2240/55 (2013.01); F16J 15/444 (2013.01)
(58) Field of Classification Search
USPC ..... 277/411, 412, 347, 355, 421; 415/174.2, 415/173.4
See application file for complete search history.

(56) References Cited

U.S. PATENT DOCUMENTS

| | | | | |
|---|---|---|---|---|
| 7,226,053 B2* | 6/2007 | Nakano | ............... | F16J 15/4472 277/355 |
| 7,261,515 B2* | 8/2007 | Nishimoto | ........... | F16J 15/3292 277/355 |
| 7,828,297 B2* | 11/2010 | Hoebel | ................ | F16J 15/3292 277/355 |
| 8,025,296 B2* | 9/2011 | Uehara | ................... | F01D 11/00 277/355 |
| 8,100,406 B2 | 1/2012 | Wright | | |
| 8,220,802 B2* | 7/2012 | Rhodes | ................ | F16J 15/3292 277/412 |
| 8,231,340 B2 | 7/2012 | Howes | | |
| 8,250,756 B2* | 8/2012 | Adis | ..................... | F16J 15/3292 277/355 |
| 8,262,349 B2* | 9/2012 | Turnquist | .............. | F01D 11/025 277/412 |
| 8,382,120 B2* | 2/2013 | Deo | ........................ | F01D 11/02 277/355 |
| 8,474,827 B2* | 7/2013 | Grondahl | ................ | F01D 11/02 277/411 |
| 9,488,279 B2 | 11/2016 | Uehara et al. | | |
| 2003/0068224 A1* | 4/2003 | Uehara | ................ | F16J 15/3292 415/170.1 |
| 2004/0256810 A1* | 12/2004 | Nakano | ................ | F16J 15/3292 277/402 |
| 2008/0042366 A1* | 2/2008 | Awtar | ................... | F01D 11/003 277/411 |
| 2008/0265514 A1* | 10/2008 | Mortzheim | ............. | F01D 11/00 277/303 |
| 2008/0309018 A1 | 12/2008 | Williams | | |
| 2009/0309311 A1* | 12/2009 | Verma | ..................... | F01D 11/00 277/411 |
| 2010/0024592 A1* | 2/2010 | Maurin-Perrier | .......................... | C23C 14/0605 74/640 |
| 2010/0247309 A1* | 9/2010 | Ambrosy | .............. | F01D 11/001 415/230 |
| 2011/0148046 A1* | 6/2011 | Jahn | ...................... | F16J 15/3292 277/412 |
| 2011/0316237 A1* | 12/2011 | Uehara | ................. | F01D 11/001 277/413 |
| 2012/0007317 A1* | 1/2012 | Beeck | ..................... | F01D 11/02 277/411 |
| 2012/0261884 A1* | 10/2012 | Uehara | ................. | F01D 11/001 277/411 |
| 2013/0004310 A1 | 1/2013 | Uehara et al. | | |
| 2013/0181412 A1* | 7/2013 | Shinohara | ................ | F16J 15/16 277/500 |
| 2013/0259680 A1 | 10/2013 | Shinohara et al. | | |
| 2016/0010751 A1 | 1/2016 | Uehara et al. | | |

FOREIGN PATENT DOCUMENTS

| | | | | |
|---|---|---|---|---|
| JP | 2003343730 A | * | 12/2003 | |
| JP | 2005-2995 | | 1/2005 | |
| JP | 3872800 | | 1/2007 | |
| JP | 2008-261498 | | 10/2008 | |
| JP | 2011-185219 | | 9/2011 | |
| JP | 2012-137033 | | 7/2012 | |
| JP | 2013177970 A | * | 9/2013 | ................ F02C 7/28 |
| JP | 2013249844 A | * | 12/2013 | ............ F01D 11/001 |
| JP | 2016153625 A | * | 8/2016 | ............. F01D 11/12 |
| KR | 10-2012-0132690 | | 12/2012 | |
| WO | 00/03164 | | 1/2000 | |
| WO | 2011/142270 | | 11/2011 | |
| WO | 2014/129371 | | 8/2014 | |

OTHER PUBLICATIONS

International Preliminary Report on Patentability dated Aug. 31, 2017 in corresponding International (PCT) Application No. PCT/JP2016/053801, with English translation.
Notification of Reasons for Refusal dated Aug. 25, 2017 in corresponding Japanese Application No. 2015-031944, with English translation.
Extended European Search Report dated Feb. 15, 2018 in European Application No. 16752352.1.
Office Action dated May 17, 2018 in Korean Application No. 10-2017-7022656, with English translation.
Notification of Reasons for Refusal dated Jan. 5, 2018 in Japanese Application No. 2015-031944 with English translation.
First Examination Report dated Oct. 18, 2019, in corresponding Indian Patent Application No. 201717028720, with English-language translation.
Office Action dated Feb. 22, 2019 in corresponding European Patent Application No. 16752352.1.

* cited by examiner

HIGH-PRESSURE SPACE 8

LOW-PRESSURE SPACE 9

AXIAL DIRECTION

ROTATIONAL DIRECTION

SEAL DEVICE FOR TURBINE, TURBINE, AND THIN PLATE FOR SEAL DEVICE

TECHNICAL FIELD

The present disclosure relates to a seal device for a turbine, a turbine, and a thin plate for a seal device.

BACKGROUND ART

Generally, in a turbine such as a gas turbine and a steam turbine, a seal device for reducing a leakage amount of a fluid that flows from the high-pressure side toward the low-pressure side is disposed between the outer peripheral surface of a rotor and the tip of a stator.

As a type of such seal device, known is a thin-plate seal structure having a plurality of thin plates (leafs) arranged in the circumferential direction of the rotor in a multiple-layered fashion, as disclosed in Patent Documents 1 to 3. Normally, the thin plates are in contact with the rotor while the turbine is stopped, but the thin-plate tip portions separate from the rotor peripheral surface while the turbine is in operation, so that the thin plates are in a non-contact state with the rotor or in a state in which the non-contact state and the contact state are mixed in time series. As compared to the labyrinth structure, the thin-plate seal structure is advantageous in that the leakage amount of fluid is small thanks to smaller clearance, as well as that abrasion of thin plates is less likely to occur thanks to the thin plates being in the non-contact state with the rotor more often, thus having a longer seal lifetime.

CITATION LIST

Patent Literature

Patent Document 1: WO2000/003164A
Patent Document 2: JP2002-13647A
Patent Document 3: 2005-2995A

SUMMARY

Problems to be Solved

However, with the thin-plate seal structure disclosed in Patent Documents 1 to 3, the thin-plate tip portions may make contact with the rotor excessively and cause abrasion if the non-contact state between the thin plates and the rotor is not established appropriately during operation of the turbine, which may impair the advantage of the long seal lifetime.

Furthermore, another problem of the thin-plate seal structure is its cantilever structure, in which the thin plates are supported on the stator at their root portions while tip portions are free ends, which may cause oscillation of the thin plates due to flutter as a fluid flows around such thin plates.

In view of the above, an object of at least one embodiment of the present invention is to provide a seal device for a turbine, a turbine, and a thin plate for a seal device, capable of suppressing oscillation of thin plates (leafs) due to flutter effectively, while appropriately establishing the non-contact state of the thin plates with the rotor.

Solution to the Problems (1) A seal device for a turbine disposed around a rotor so as to separate a high-pressure space and a low-pressure space, according to at least one embodiment of the present invention, comprises: a plurality of thin plates arranged along an outer peripheral surface of the rotor, each of the thin plates including a root portion which is disposed on an outer side in a radial direction of the rotor and which is supported on a stationary part of the turbine and a tip portion which is disposed on an inner side in the radial direction of the rotor and which has a tip surface facing the outer peripheral surface of the rotor. Each of the thin plates is configured such that a width direction of the thin plate is parallel to an axial direction of the rotor at a side of the root portion. The tip portion of each of the thin plates is configured such that an end on a side of the high-pressure space is positioned downstream of another end on a side of the low-pressure side, in a rotational direction of the rotor, in a cross-section taken along the width direction of the thin plate.

With the above configuration (1), the width direction of each thin plate is parallel to the axial direction of the rotor at the side of the root portion. Thus, the thin plate is less likely to be affected by the dynamic pressure on the side of the root portion, and thereby it is possible to suppress distortion of the side of the root portion with respect to the axial direction of the rotor, which may impair levitation of the side of the tip portion from the outer peripheral surface of the rotor.

Furthermore, the tip portion of each thin plate has an end on the side of the high-pressure space that is disposed downstream of another end on the side of the low-pressure space in the rotational direction of the rotor, in a cross-section along the width direction of the thin plate. Thus, at least in the region on the side of the high-pressure space, of the tip portion of the thin plate, the tip portion has an attack angle greater than 0° with respect to the flow of fluid that flows toward the low-pressure space from the high-pressure space. Accordingly, the region of the tip portion on the side of the high-pressure space levitates more easily from the outer peripheral surface of the rotor in response to an influence of the dynamic pressure, and thus it is possible to realize the non-contact state between the rotor and the thin plate appropriately. That is, the region of the tip portion on the side of the high-pressure space of the thin plate is pushed upward from the outer peripheral surface of the rotor due to an influence of the dynamic pressure, which makes it easier for the tip portion to levitate. Furthermore, the region of the tip portion on the side of the high-pressure space deforms to distort with respect to the axial direction of the rotor in response to an influence from the dynamic pressure, and thereby the thin plates are more likely to contact each other at the side of the low-pressure space. When being in contact with one another as described above, the thin plates support one another and thereby it is possible to suppress oscillation of the thin plates due to flutter.

(2) In some embodiments, in the above configuration (1), each of the thin plates satisfies a relationship $\Delta x_1 > \Delta x_2 > 0$, where $\Delta x_1$ is a position offset amount of the thin plate downstream in the rotational direction from the root portion toward the tip portion, at a first position closest to the high-pressure space in the width direction of the thin plate, and $\Delta x_2$ is a position offset amount of the thin plate downstream in the rotational direction from the root portion toward the tip portion, at a second position closest to the low-pressure space in the width direction of the thin plate.

With the above configuration (2), the tip portion of the thin plate is offset downstream in the rotational direction of the rotor compared to the root portion also on the side of the low-pressure space, and thus contact between the thin-plates on the side of the low-pressure space is even more likely to occur.

(3) In an embodiment, in the above configuration (1) or (2), each of the thin plates further includes a distorted portion disposed between the root portion and the tip portion, the distorted portion having a curved shape and connecting the root portion and the tip portion.

With the above configuration (3), separation of a flow is less likely to occur around the thin plates, and thus it is possible to realize the non-contact state of the tip portions of the thin plates stably without impairing formation of the static-pressure distribution between the thin plates for levitating the tip portions of the thin plates.

(4) In some embodiments, in the above configuration (1) or (2), each of the thin plates is bended along at least one flexure line extending inward in the radial direction from the side of the high-pressure space toward the side of the low-pressure space.

With the above configuration (4), the thin-plate tip portion can be machined easily.

(5) In some embodiments, in any one of the above configurations (1) to (4), the seal device further comprises: a first side plate disposed so as to face the high-pressure space and covering outer peripheral regions of first side surfaces, on the side of the high-pressure space, of the plurality of thin plates; and a second side plate disposed so as to face the low-pressure space and covering outer peripheral regions of second side surfaces, on the side of the low-pressure space, of the plurality of thin plates. The first side surface of each of the thin plates is covered with the first side plate in a region extending further to an inner side, in the radial direction of the rotor, than a region of the second side surface covered with the second side plate.

With the above configuration (5), an upward flow flowing from a rotor-side end portion of the thin plate toward a stator-side end portion is formed in the gap between the thin plates, and it is possible to form a suitable static-pressure distribution for causing the thin plates to levitate from the peripheral surface of the rotor. Thus, it is possible to maintain the non-contact state stably between the rotor and the thin plates.

(6) In an embodiment, in the above configuration (5), a radial-directional position of the tip surface of each of the thin plates has a such a distribution that the side of the high-pressure space is further away from the outer peripheral surface of the rotor than the side of the low-pressure space in the axial direction of the rotor, and the radial-directional position of the tip surface of the thin plate at an axial-directional position closest to the high-pressure space is disposed on an inner side of an inner peripheral edge of the second side plate in the radial direction.

With the above configuration (6), the flow rate of the above described upward flow on the side of the high-pressure space increases, and the gap between the thin plates on the side of the low-pressure space becomes relatively narrow. Thus, distortion of the thin plate due to the upward flow increases, and contact between the thin plates on the side of the low-pressure space accompanying the distortion is even more likely to occur. Accordingly, it is possible to suppress oscillation of the thin plates due to flutter effectively.

(7) In some embodiments, in the above configurations (1) to (6), the seal device further comprises a retainer configured to hold a side of the root portion of the plurality of thin plates. The first side plate and the second side plate are supported by the retainer while being nipped between the retainer and a corresponding one of both side surfaces of the plurality of thin plates.

(8) A turbine according to at least one embodiment of the present invention comprises: a rotor having a turbine blade; and the seal device according to any one of the above (1) to (7) disposed around the rotor so as to separate an annular space around the rotor into a high-pressure space and a low-pressure space.

With the above configuration (8), it is possible to maintain the non-contact state between the rotor and the thin plates stably, which makes it possible to prevent abrasion of the thin plates and to suppress oscillation of the thin plates due to flutter, thus providing a highly-reliable turbine.

(9) A thin plate for the seal device for a turbine according at least one embodiment of the present invention is the thin plate for the seal device according to any one of the above (1) to (7).

Advantageous Effects

According to at least one embodiment of the present invention, the side of the root portion of the thin plate is less affected by the dynamic pressure, while the side of the tip portion levitates easily from the outer peripheral surface of the rotor in response to an influence of the dynamic pressure. Thus, it is possible to realize a non-contact state between the rotor and the thin plates appropriately.

Furthermore, the region of the tip portion on the side of the high-pressure space deforms to distort with respect to the axial direction of the rotor in response to an influence from the dynamic pressure, and thereby the thin plates are more likely to make contact with each other at the side of the low-pressure space. Accordingly, it is possible to suppress oscillation of the thin plates due to flutter.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
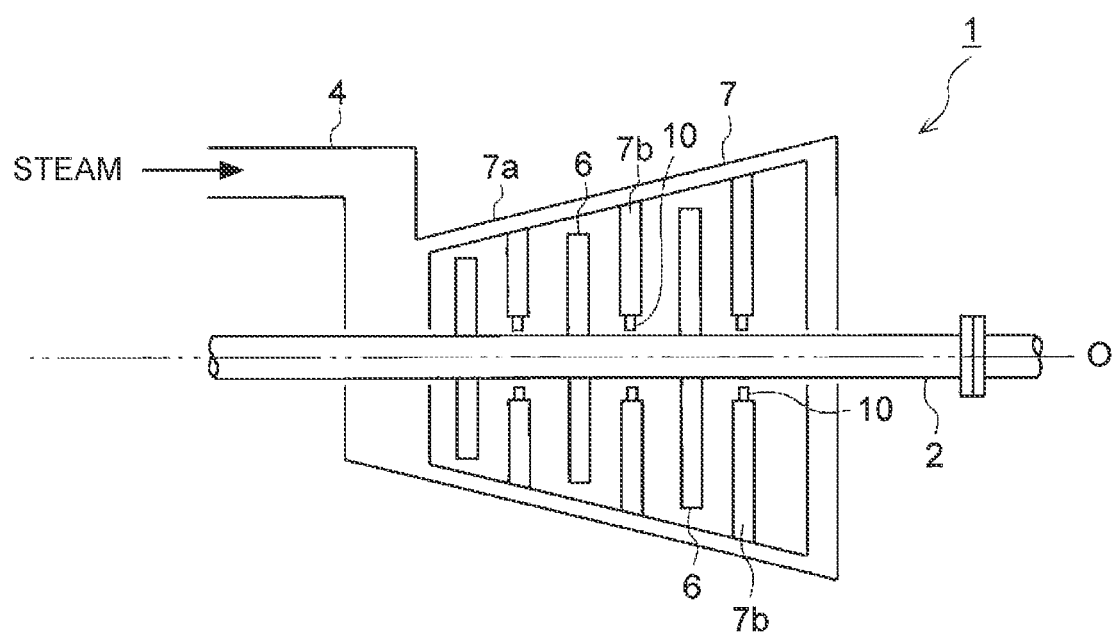
FIG. 1 is a schematic configuration diagram of a steam turbine according to some embodiments.

First, the steam turbine 1 shown in FIG. 1 will be described as an example of a turbine according to the present embodiment. FIG. 1 is a schematic configuration diagram of the steam turbine 1 according to some embodiments.

As shown in FIG. 1, the steam turbine 1 according to some embodiments is configured to rotary drive the rotor 2 with steam introduced into a casing 7a from a steam inlet 4. In the drawing, the steam discharging mechanism such as an exhaust chamber is not shown.

Specifically, the steam turbine 1 includes a plurality of rotor blades 6 disposed on the side of the rotor 2, a stator (stationary part) 7 including the casing 7a and a plurality of stationary vanes 7b disposed on the side of the casing 7a, and seal devices 10 disposed on the tips of the stationary vanes 7b.

The plurality of rotor blades 6 and the plurality of stationary vanes 7b are arranged alternately in the direction of the rotational axis O of the rotor 2 (hereinafter, referred to as the axial direction). The rotor 2 rotates as the steam flowing along the axial direction passes through the rotor blades 6 and the stationary vanes 7b, and rotational energy imparted to the rotor 2 is extracted from the end of the shaft to be utilized for power generation or the like.

Next, with reference to FIGS. 2 to 10, a specific configuration of the seal device 10 according to some embodiments will be described.

Figure 2A:
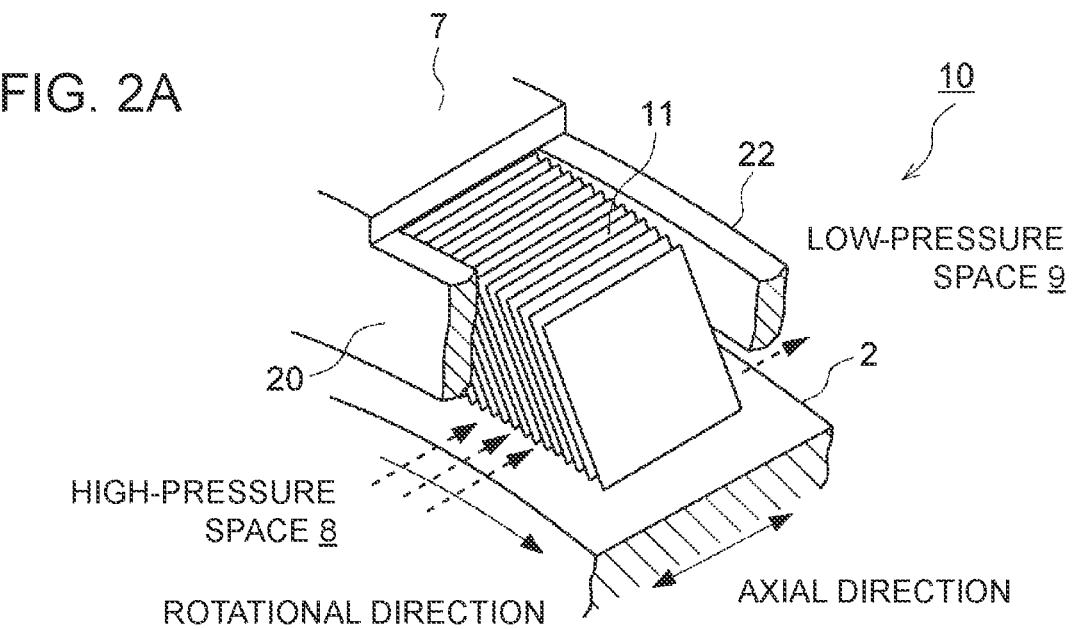
FIG. 2A is a perspective view schematically showing a seal device according to some embodiments.
Figure 2B:
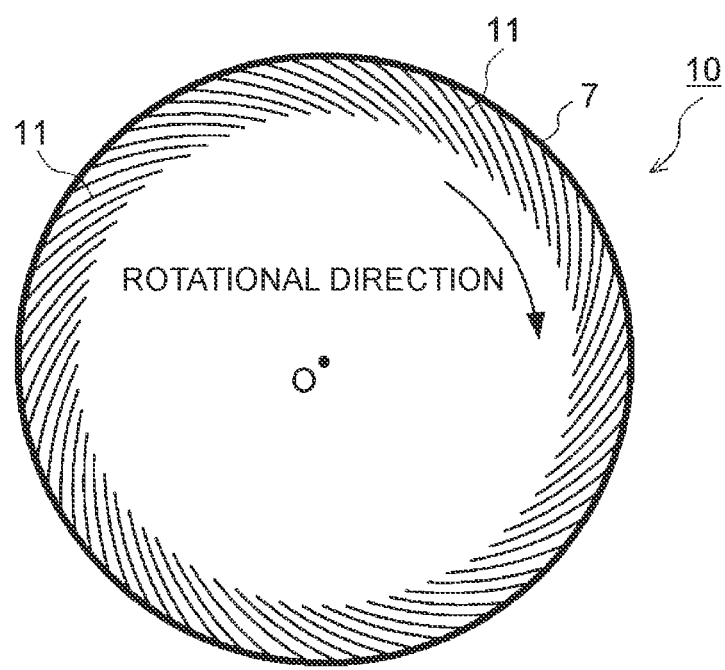
FIG. 2B is a diagram schematically showing a layout of thin plates in a seal device.
Figure 3A:
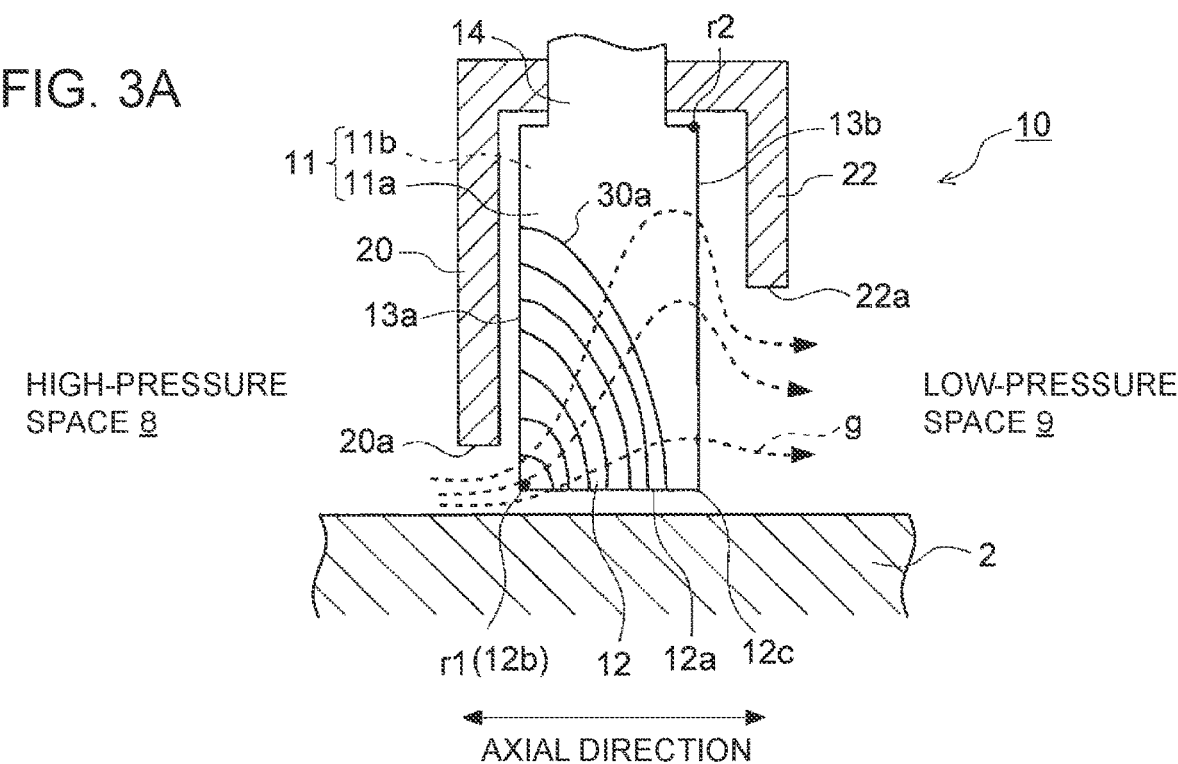
FIG. 3A is a diagram showing a static-pressure distribution in a gap between thin plates according to an embodiment.
Figure 3B:
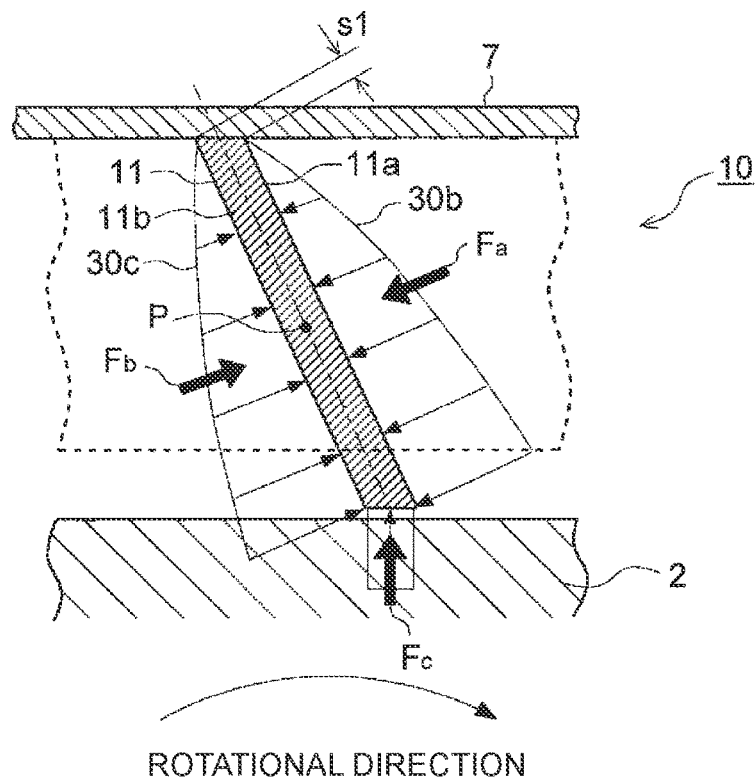
FIG. 3B is a cross-sectional view for describing the operation of a thin plate, taken in a direction perpendicular to the rotational axis of a rotor.
Figure 9:
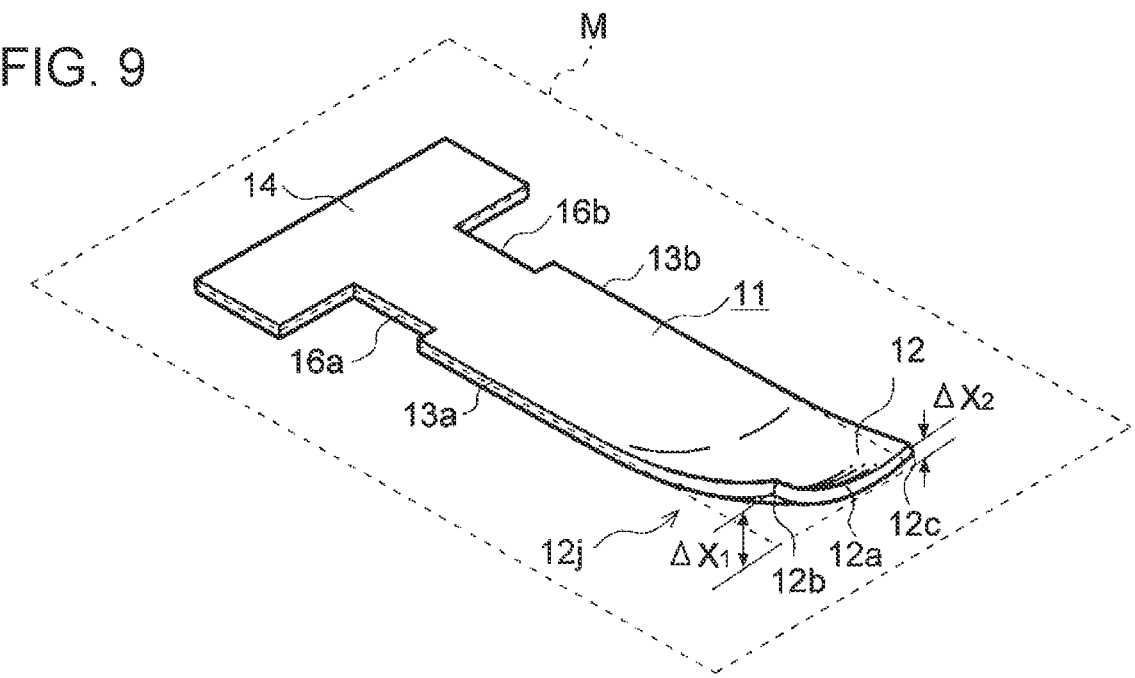
FIG. 9 is a perspective view of the thin plate shown in FIGS. 8A to 8D.
Figure 10:
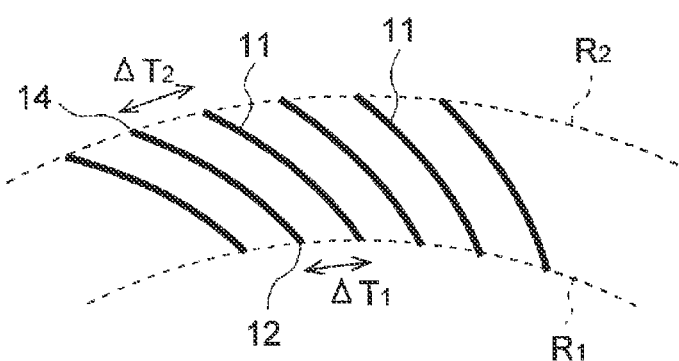
FIG. 10 is a diagram for describing the interval between thin plates.

FIG. 2A is a perspective view schematically showing the seal device 10 according to some embodiments. FIG. 2B is a diagram schematically showing a layout of thin plates 11 in the seal device 10. FIG. 3A is a diagram showing a static-pressure distribution in a gap between the thin plates 11 according to an embodiment. FIG. 3B is a cross-sectional view for describing the operation of a thin plate 11, taken in a direction perpendicular to the rotational axis O of the rotor 2. FIGS. 4A to 9 are each a configuration diagram of the seal device 10 according to each embodiment. FIG. 10 is a diagram for describing the interval of thin plates 11.

As shown in FIGS. 2A to 8D, the seal device 10 according to the present embodiment is disposed around the rotor 2 so as to separate the high-pressure space 8 and the low-pressure space 9, and configured to reduce the leakage amount of fluid (combustion gas) that leaks from the high-pressure space 8 to the low-pressure space 9. The seal device 10 has a thin-plate seal structure having a plurality of thin plates (leafs) 11 arranged in the circumferential direction of the rotor 2 in a multiple-layered fashion.

In some embodiments, the seal device 10 includes a plurality of thin plates 11 arranged along the outer peripheral surface of the rotor 2, a first side plate 20 disposed so as to face the high-pressure space 8, and a second side plate 22 disposed so as to face the low-pressure space 9.

Specifically, the plurality of thin plates 11 are disposed inside an annular space between the rotor 2 and the stator 7, and arranged in the circumferential direction of the rotor 2 in a multiple-layered fashion, separated from one another via a minute space. The plurality of thin plates 11 are disposed on the substantially same width-directional position with respect to the axial direction of the rotor 2.

Each thin plate 11 is flexible, including a root portion 14 fixed to the stator 7 and a tip portion 12 being a free end disposed on the side of the rotor 2. Each thin plate 11 is disposed so as to be inclined to form an acute angle with the outer peripheral surface of the rotor 2 in the circumferential direction. That is, each thin plate 11 is disposed so as to be inclined to form an angle of more than zero degree with respect to the radial direction of the rotor 2. While the steam turbine 1 is stopped (the rotor 2 is stopped), the tip portion 12 of each thin plate 11 is in contact with the outer peripheral surface of the rotor 2.

The first side plate 20 is an annular thin plate disposed so as to face the high-pressure space 8, and is formed so as to cover an outer-peripheral region (a region on the side of the root portion 14) of the first side surface 13a of each of the plurality of thin plates 11, the first side surface 13a being disposed on the side of the high-pressure space 8.

The second side plate 22 is an annular thin plate disposed so as to face the low-pressure space 9, and is formed so as to cover an outer-peripheral region (a region on the side of the root portion 14) of the second side surface 13b of each of the plurality of thin plates 11, the side surface 13b being disposed on the side of the low-pressure space 9.

In the present embodiment, the outer-peripheral side refers to the outside in the radial direction of the rotor 2.

In an embodiment, the first side surface 13a of each thin plate 11 is covered with the first side plate 20 over a region extending further to the inner side in the radial direction of the rotor 2 than a region of the second side face 13b that is covered with the second side plate 22. Specifically, the distance between the outer peripheral surface of the rotor 2 and the inner peripheral edge 20a of the first side plate 20 (end portion on the side of the rotor 2) is smaller than the distance between the outer peripheral surface of the rotor 2 and the inner peripheral edge 22a of the second side plate 22 (end portion on the side of the rotor 2).

With this configuration, an upward flow flowing from the end portion on the side of the rotor 2 of the thin plate 11 toward the end portion on the side of the stator 7 is formed in the gap between the thin plates 11, and it is possible to form a suitable static-pressure distribution for causing the thin plates 11 to levitate from the outer peripheral surface of the rotor 2. Thus, it is possible to maintain a non-contact state stably between the rotor 2 and the thin plates 11 stably.

With reference to FIGS. 3A and 3B, the operation of the seal device 10 will be described. FIG. 3A is a cross-sectional view of the seal device 10 along a plane passing through the gap between the thin plates 11. FIG. 3B is a cross-sectional view of the seal device 10 along a plane perpendicular to the width direction of the thin plates 11, that is a cross-sectional view taken in a direction perpendicular to the axial direction of the rotor 2.

As shown in FIGS. 3A and 3B, the thin plates 11 are inclined with respect to the outer peripheral surface of the rotor 2, and thus has a lower surface 11b facing the rotor 2 and an upper surface 11a disposed opposite to the lower surface 11b and facing the stator 7 (see FIG. 1). Furthermore, in the configuration example shown in FIG. 3A, in the width direction of the thin plate 11, the gap between the thin plate 11 and the second side plate 22 is greater than the gap between the thin plate 11 and the first side plate 20.

As shown in FIG. 3A, during operation of the steam turbine 1 (rotation of the rotor 2), when a pressure of a fluid flowing from the high-pressure space 8 toward the low-pressure space 9 is applied to each thin plate 11, a static-pressure distribution 30a is formed, in which the fluid pressure is highest at the end portion r1 of the tip portion 12 on the side of the high-pressure space 8 and becomes weaker gradually toward the corner portion r2 in the diagonally opposite position, on the upper surface 11a and the lower surface 11b of each thin plate 11.

In other words, the fluid g flowing from the high-pressure space 8 toward the low-pressure space 9 forms a flow shown by the dotted line in FIG. 3A when passing through the gap between the thin plates 11. Specifically, the fluid g flows into the gap between the thin plates 11 through the clearance between the outer peripheral surface of the rotor 2 and the inner peripheral edge 2 of the first side plate 20 from the high-pressure space 8, and forms an upward flow that flows from the end portion r1 of the tip portion 12 on the side of the high-pressure space 8 toward the corner portion r2 on the side of the root portion 14 on the side of the low-pressure space 9. The upward flow is formed radially from the side of the end portion r1 of the tip portion 12 on the side of the high-pressure space 8 in the gap between the thin plates 11. The fluid g forms a downward flow in the gap between the thin plates 11 and the second side plate 22, and flows into the low-pressure space 9 through the clearance between the outer peripheral surface of the rotor 2 and the inner peripheral edge 22a of the second side plate 22.

Accordingly, as shown in FIG. 3B, the fluid-pressure distributions 30b, 30c applied in a perpendicular direction to the upper surface 11a and the lower surface 11b of each thin plate 11 has a triangular distribution shape that becomes larger toward the tip portion 12 and smaller toward the root portion 14.

While the respective fluid-pressure distributions 30b, 30c of the upper surface 11a and the lower surface 11b have substantially the same shape, each thin plate 11 is disposed inclined so as to form an acute angle with the outer peripheral surface of the rotor 2, and thus the relative positions of the respective fluid-pressure distributions 30b, 30c of the upper surface 11a and the lower surface 11b are offset by the dimension s1. Accordingly, the upper surface 11a and the lower surface 11b have different fluid pressures at a point P on a line between the root portion 14 and the tip portion 12 of the thin plate 11.

In other words, on a point P in the length direction of the thin plate 11, the fluid pressure (Fb) applied to the lower surface 11b is higher than the gas pressure (Fa) applied to the upper surface 11a, and thus the pressures act in a direction that the thin plate 11 deforms and levitates from the rotor 2. Meanwhile, the direction is opposite in the vicinity of the tip portion 12 of each thin plate 11, where the fluid pressure is applied only to the upper surface 11a. This force is canceled by the fluid pressure (Fc) of the fluid g flowing between the outer peripheral surface of the rotor 2 and the tip of the thin plate 11 acting in a direction to levitate the tip portion 12 of the thin plate 11 from the outer peripheral surface of the rotor 2, which prevents generation of a force that pushes the tip of the thin plate 11 against the rotor 2. Thus, the pressure load of the fluid pressure applied to each thin plate 11 is (Fb+Fc)>Fa, and thereby it is possible to deform each thin plate 11 so as to levitate from the outer peripheral surface of the rotor 2.

Accordingly, it is possible to generate a pressure difference between the upper surface 11a and the lower surface 11b of each thin plate 11, and deform the thin plates 11 to levitate from the outer peripheral surface of the rotor 2 to create a non-contact state. It should be noted that, during operation of the steam turbine 1, the thin plate 11 and the rotor 2 are mainly in a non-contact state, but a non-contact state and a contact state may exist mixed in time series.

The above description features the mechanism to bring each thin plate 11 into a non-contact state with the rotor 2 by utilizing a pressure difference at pressurization from the high-pressure space 8. Besides this mechanism, levitation of each thin plate 11 is also caused in response to a dynamic-pressure effect from rotation of the rotor 2.

That is, each thin plate 11 is designed to have a predetermined rigidity that depends on the plate thickness in the axial direction of the rotor 2. Furthermore, each thin plate 11 is mounted to the stator 7 so as to form an acute angle with the outer peripheral surface of the rotor 2 with respect to the rotational direction of the rotor 2 as described above, so that the tip of each thin plate 11 is in contact with the rotor 2 at a predetermined pre-compression pressure while the rotor 2 is stopped, but each thin plate 11 and the rotor 2 are in a non-contact state when the rotor 2 rotates because the dynamic-pressure effect caused by rotation of the rotor 2 causes the tip of the thin plate 11 to levitate.

The seal device 10 having the above configuration further includes the following configuration in order to suppress oscillation due to flutter of the thin plates 11 effectively while realizing the non-contact state of the thin plates 11 with the rotor 2 appropriately.

As shown in FIGS. 4A to 8D, in the seal device 10 according to some embodiments, each thin plate 11 is configured such that the width-direction of the thin plate 11 is parallel to the axial direction of the rotor 2 on the side of the root portion 14. In other words, like the cross-section on the side of the root portion 14 shown in respective embodiments of FIG. 4C to FIG. 8C, the width direction between the first side surface 13a and the second side surface 13b of the thin plate 11 is parallel to the axial direction of the rotor 2.

Accordingly, the thin plate 11 is less likely to be affected by the dynamic pressure on the side of the root portion 14, and thereby it is possible to suppress distortion of the side of the root portion 14 with respect to the axial direction of the rotor 2, which may impair levitation of the side of the tip portion 12.

Furthermore, the end portion 12 of each thin plate 11 has an end on the side of the high-pressure space 8 that is disposed downstream of another end on the side of the low-pressure space 9 in the rotational direction of the rotor 2, in a cross-section along the width direction of the thin plate 11. In other words, as in the cross-section on the side of the tip portion 12 shown in FIGS. 4B to 8B of the respective embodiments, the end portion 12b on the side of the high-pressure space 8 is disposed downstream of the end portion 12c on the side of the low-pressure space 9 in the rotational direction of the rotor 2.

Thus, at least in the region on the side of the high-pressure space 8, of the tip portion 12 of the thin plate 11, the tip portion 12 has an attack angle greater than 0° with respect to the flow of fluid that flows toward the low-pressure space 9 from the high-pressure space 8. Accordingly, a region of the tip portion 12 of the thin plate 11 on the side of the high-pressure space 8 more easily levitates from the outer peripheral surface of the rotor 2 in response to an influence of the dynamic pressure, and thus it is possible to realize the non-contact state between the rotor 2 and the thin plate 11 appropriately. That is, the region of the tip portion 12 on the side of the high-pressure space 8 of the thin plate 11 is pushed upward from the outer peripheral surface of the rotor 2 due to an influence of the dynamic pressure, which makes it easier for the tip portion 12 to levitate. Furthermore, the region of the tip portion 12 on the side of the high-pressure space 8 deforms to distort with respect to the axial direction of the rotor 2 in response to an influence from the dynamic pressure, and thereby the thin plates 11 are more likely to contact each other at the side of the low-pressure space 9. When being in contact with one another as described above, the thin plates 11 support one another, and thereby it is possible to suppress oscillation of the thin plates 11 due to flutter.

Specifically, when the rotor 2 rotates, the tip portion 12 of the thin plate 11 levitates from the outer peripheral surface of the rotor 2 due to the static-pressure distribution as described above, and is in a non-contact state with respect to the outer peripheral surface of the rotor 2. At this time, the thin plate 11 having flexibility is slightly curved in the length direction from the root portion 14 to the tip portion 12. As described above, at the tip portion 12 of each thin plate 11, if the end portion 12b on the side of the high-pressure space 8 is disposed downstream of the end portion 12c on the side of the low-pressure space 9 in the rotational direction of the rotor 2, the levitation amount of the end portion 12b on the side of the high-pressure space 8 is greater than the levitation amount of the end portion 12c on the side of the low-pressure space 9 due to an influence of the dynamic pressure. That is, as in the cross-section of the tip portion 12 shown in FIG. 4B to FIG. 8B, the end portion 12b on the side of the high-pressure space 8 is originally disposed downstream of the end portion 12c on the side of the low-pressure space 9 in the rotational direction of the rotor 2, and the end portion 12b on the side of the high-pressure space 8 levitates even further in response to an influence from the dynamic pressure, which causes the position of the end portion 12b on the side of the high-pressure space 8 to be offset further downstream in the rotational direction of the rotor 2. Thus, the thin plate 11 deforms to distort even further with respect to the width direction of the rotor 2.

Meanwhile, as shown in FIG. 10, the plurality of thin plates 11 are arranged in the circumferential direction of the rotor 2, and thus the circumferential length $R_2$ passing through the root portions 14 of the thin plates 11 is greater than the circumferential length $R_1$ passing through the tip portions 12. Due to the circumferential-length difference between the circumferential length $R_2$ and the circumferential length $R_1$, the distance $\Delta T_2$ between the root portions 14 of adjacent thin plates 11 is greater than the distance $\Delta T_1$ between the tip portions 12. That is, the gap between the tip portions 12 of adjacent thin plates 11 is narrower than the gap between the root portions 14. In particular, the gap between the tip portions 12 is narrower at the side of the low-pressure space closer to the outer peripheral surface of the rotor 2. Thus, if the above described distortion occurs at the tip portions 12 of the thin plates 11, the thin plates 11 are more likely to make contact with each other at the side of the low-pressure space 9. As described above, the thin plates 11 support one another when being in contact with one another, and thereby it is possible to suppress oscillation of the thin plates 11 due to flutter.

In an embodiment, the seal device 10 is configured such that the radial-directional position of the thin-plate tip surface 12a at the axial-directional position closest to the high-pressure space 8 is disposed on the inner side, in the radial direction, of the inner peripheral edge 20a of the first side plate 20.

For instance, if the radial-directional position of the thin-plate tip surface 12a is on the outer side, in the radial direction, of the inner peripheral edge 20a of the first side plate 20, the space between the outer peripheral surface of the rotor 2 and the thin-plate tip surface 12a becomes excessively great, increasing the clearance between the outer peripheral surface of the rotor 2 and the thin-plate tip surface 12a at levitation of thin plate 11, which may decrease the shaft seal effect.

In this regard, with the above configuration, the radial-directional position of the thin-plate tip surface 12a is on the inner side, in the radial direction, of the inner peripheral edge 20a of the first side plate 20, and thereby it is possible to form the space between the outer peripheral surface of the rotor 2 and the thin-plate tip surface 12a appropriately, and to suppress oscillation due to flutter while maintaining the shaft seal effect.

Further, in an embodiment, the radial-directional position of the tip surface 12a of each thin plate 11 has such a distribution that the side of the high-pressure space 8 is more away from the outer peripheral surface of the rotor 2 than the side of the low-pressure space 9, in the axial direction of the rotor 2. That is, each thin plate 11 is configured such that, of the thin-plate tip surface 12a, the distance between the end portion 12b on the side of the high-pressure space 8 and the outer peripheral surface of the rotor 2 is greater than the distance between the end portion 12c on the side of the low-pressure space 9 and the outer peripheral surface of the rotor 2. Thus, between the end portion 12b on the side of the high-pressure space 8 and the end portion 12c on the side of the low-pressure space 9, the tip portion 12 of the thin plate 11 is formed so that the distance between the thin-plate tip surface 12a and the outer peripheral surface of the rotor 2 decreases continuously or intermittently, or in stages, from the side of the high-pressure space 8 toward the side of the low-pressure space 9. Further, the tip portion 12 of the thin plate 11 is configured such that the radial-directional position of the thin-plate tip surface 12a at the axial-directional position closest to the high-pressure space 8 is disposed on the inner side, in the radial direction, of the inner peripheral edge 22a of the second side plate 22. That is, of the thin-plate tip surface 12a, the distance between the end portion 12b on the side of the high-pressure space 8 and the outer peripheral surface of the rotor 2 is smaller than the distance between the inner peripheral edge 22a of the second side plate 22 and the outer peripheral surface of the rotor 2.

With this configuration, the flow rate of the above described upward flow on the side of the high-pressure space 8 increases, and the gap between the thin plates 11 on the side of the low-pressure space 9 becomes relatively narrow. Thus, distortion of the thin plate 11 due to the upward flow increases, and contact between the thin plates 11 on the side of the low-pressure space 9 accompanying the distortion is even more likely to occur. Accordingly, it is possible to suppress oscillation of the thin plates 11 due to flutter effectively.

In this case, the seal device 10 may be configured such that the radial-directional position of the thin-plate tip surface 12a at the axial-directional position closest to the high-pressure space 8 is disposed on the inner side, in the radial direction, of the inner peripheral edge 20a of the first side plate 20.

For instance, if the radial-directional position of the thin-plate tip surface 12a is on the outer side, in the radial direction, of the inner peripheral edge 20a of the first side plate 20, the space between the outer peripheral surface of the rotor 2 and the thin-plate tip surface 12a becomes excessively large, increasing the clearance between the outer peripheral surface of the rotor 2 and the thin-plate tip surface 12a at levitation of thin plate 11, which may decrease the shaft seal effect.

In this regard, with the above configuration, the radial-directional position of the thin-plate tip surface 12a is on the inner side, in the radial direction, of the inner peripheral edge 20a of the first side plate 20, and thereby it is possible to form a space between the outer peripheral surface of the rotor 2 and the thin-plate tip surface 12a appropriately, and to suppress oscillation due to flutter while maintaining the shaft seal effect.

Further, between the end portion 12b on the side of the high-pressure space 8 and the end portion 12c on the side of the low-pressure space 9, the tip portion 12 of the thin plate 11 may be formed so that the distance between the thin-plate tip surface 12a and the outer peripheral surface of the rotor 2 decreases continuously or intermittently, or in stages, from the side of the high-pressure space 8 toward the side of the low-pressure space 9.

Next, a specific configuration example of the seal device 10 according to each embodiment will be described. In FIGS. 4A to 9, features having the same configuration are associated with the same reference numeral, and features having different configurations are associated with different reference numerals.

Figure 4A:
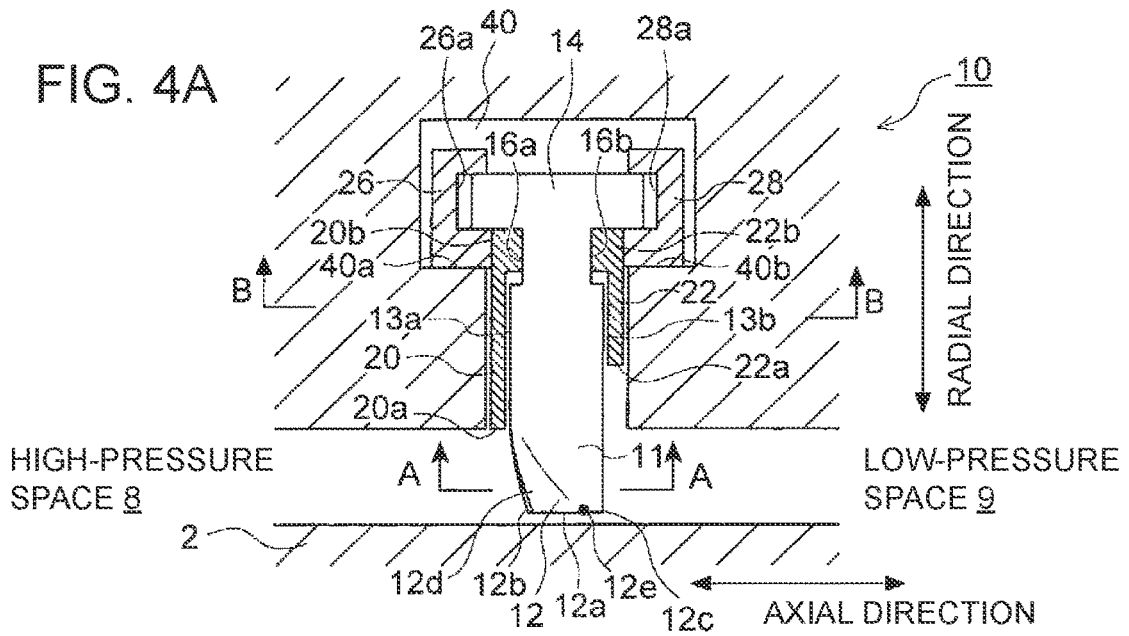
FIG. 4A is a cross-sectional view of a seal device according to an embodiment.
Figure 4B:
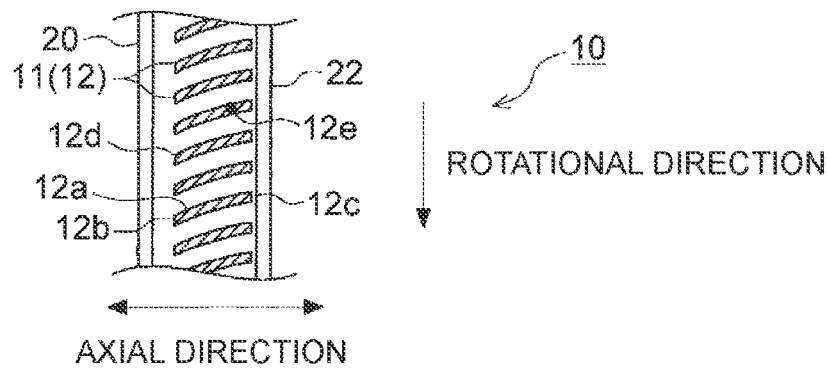
FIG. 4B is a diagram of the seal device in FIG. 4A as seen in the direction of arrow A.
Figure 4C:
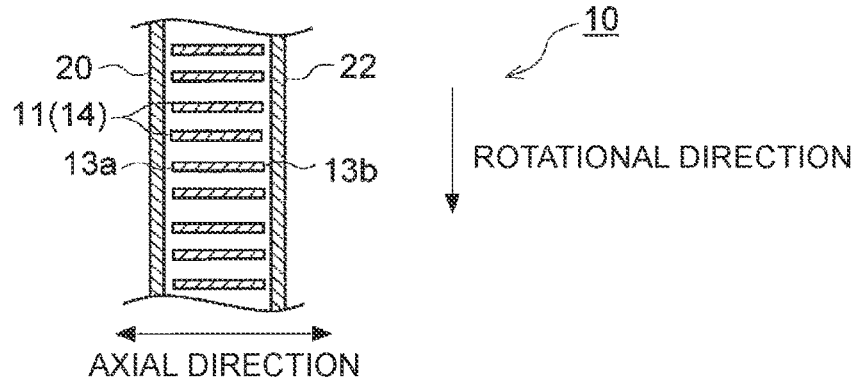
FIG. 4C is a diagram of the seal device in FIG. 4A as seen in the direction of arrow B.
Figure 4D:
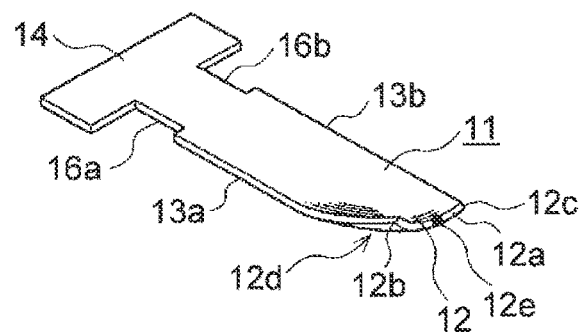
FIG. 4D is a perspective view of the thin plate shown in FIG. 4A.

FIG. 4A is a cross-sectional view of a seal device according to an embodiment. FIG. 4B is a diagram of the seal device in FIG. 4A as seen in the direction of arrow A. FIG. 4C is a diagram of the seal device in FIG. 4A as seen in the direction of arrow B. FIG. 4D is a perspective view of the thin plate shown in FIG. 4A.

In the seal device 10 according to an embodiment, each thin plate 11 further includes a distorted portion 12d having a curved shape disposed between the root portion 14 and the end portion 12 and connecting the root portion 14 and the tip portion 12. In the shown example, the distorted portion 12d is formed from the end portion 12b on the side of the high-pressure space 8 to the position 12e closer to the high-pressure space 8 than the end portion 12c on the side of the low-pressure space 9.

With this configuration, separation of a flow is less likely to occur around the thin plates 11, and thus it is possible to realize the non-contact state of the end portions 12 of the thin plates 11 stably without impairing formation of the static-pressure distribution between the thin plates 11 for levitating the tip portions 12 of the thin plates 11.

Figure 5A:
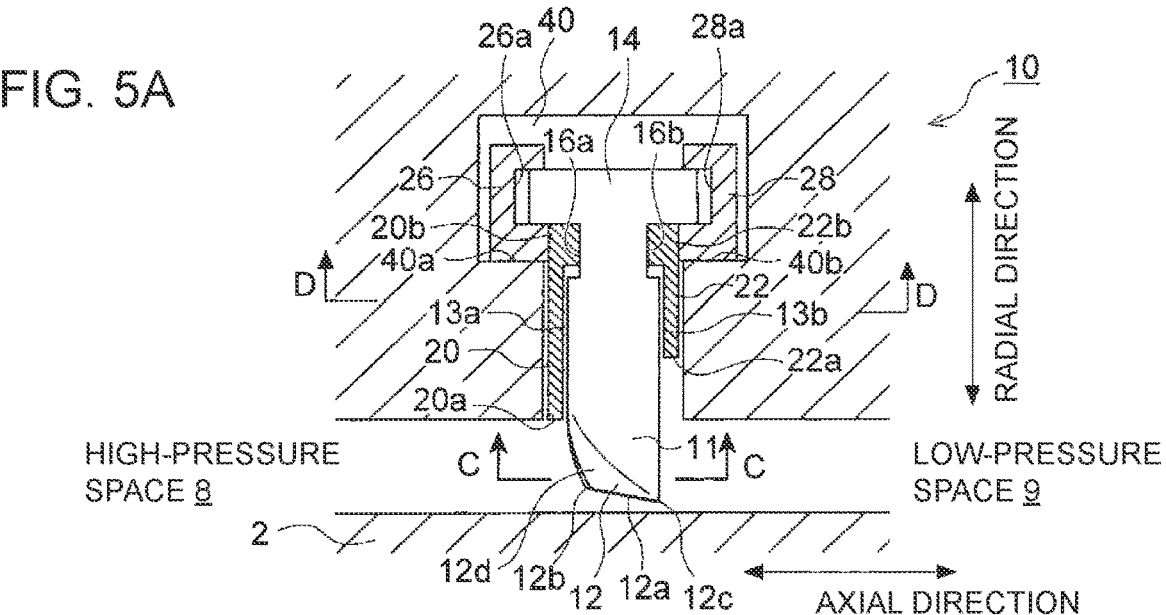
FIG. 5A is a cross-sectional view of a seal device according to another embodiment.
Figure 5B:
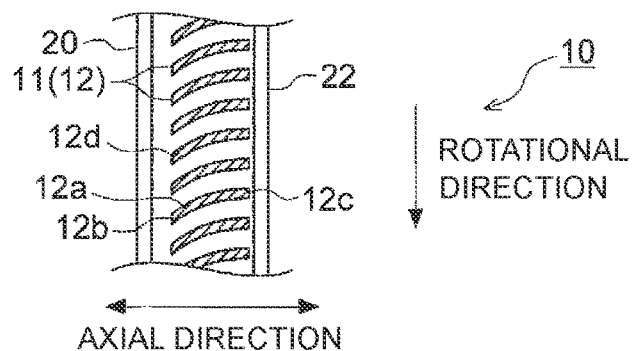
FIG. 5B is a diagram of the seal device in FIG. 5A as seen in the direction of arrow C.
Figure 5C:
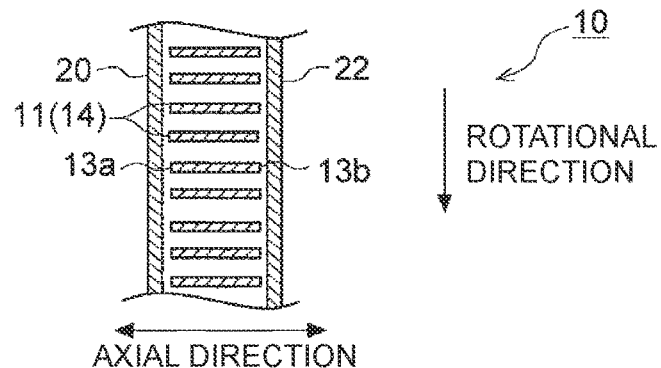
FIG. 5C is a diagram of the seal device in FIG. 5A as seen in the direction of arrow D.
Figure 5D:
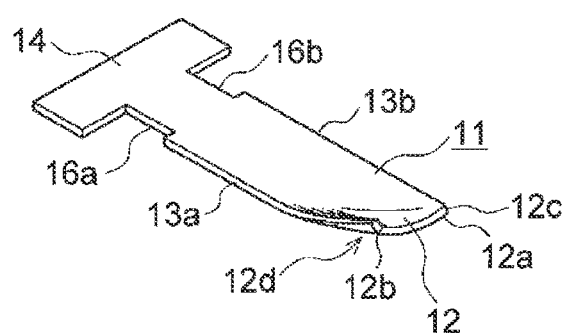
FIG. 5D is a perspective view of the thin plate shown in FIG. 5A.

FIG. 5A is a cross-sectional view of a seal device according to another embodiment. FIG. 5B is a diagram of the seal device in FIG. 5A as seen in the direction of arrow C. FIG. 5C is a diagram of the seal device in FIG. 5A as seen in the direction of arrow D. FIG. 5D is a perspective view of the thin plate shown in FIG. 5A.

In the seal device 10 according to another embodiment, each thin plate 11 further includes a distorted portion 12d having a curved shape disposed between the root portion 14 and the end portion 12 and connecting the root portion 14 and the tip portion 12. In the depicted example, the distorted portion 12d is formed over the entire region from the end portion 12b on the side of the high-pressure space 8 to the end portion 12c on the side of the low-pressure space 9. In this configuration, the position of the end portion 12c on the side of the low-pressure space 9 in the rotational direction is substantially the same as the position of the second side surface 13b on the side of the root portion 14. That is, the second side surface 13b is formed linearly from the root portion 14 to the tip portion 12.

With this configuration, separation of a flow is less likely to occur around the thin plates 11, and thus it is possible to realize the non-contact state of the tip portions 12 of the thin plates 11 stably without impairing formation of the static-pressure distribution between the thin plates 11 for levitating the tip portions 12 of the thin plates 11.

Figure 6A:
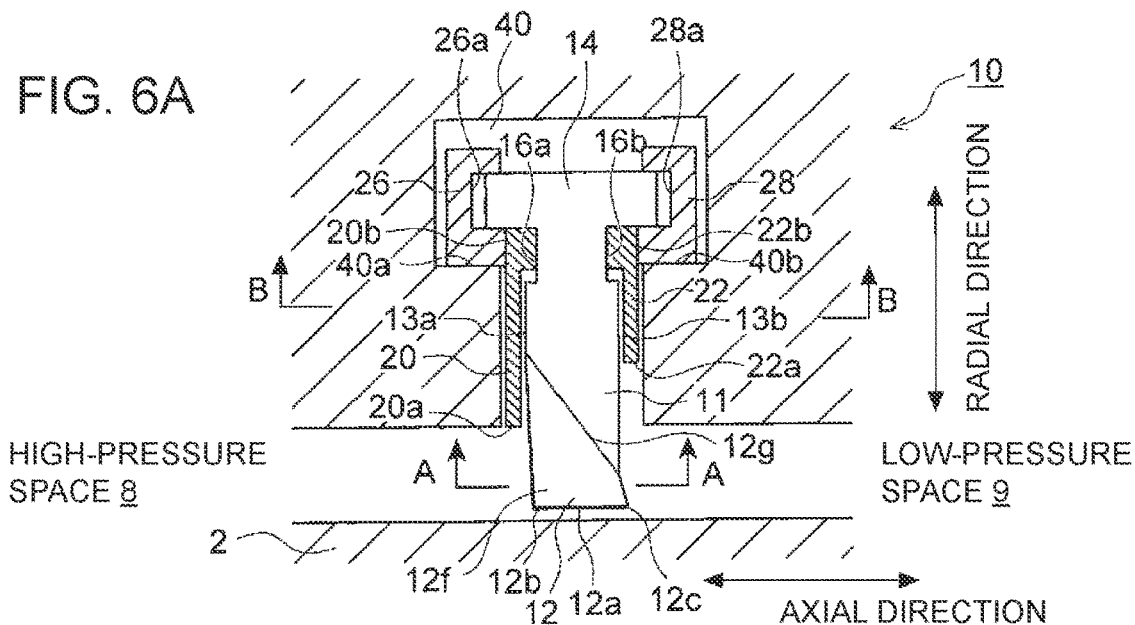
FIG. 6A is a cross-sectional view of a seal device according to another embodiment.
Figure 6B:
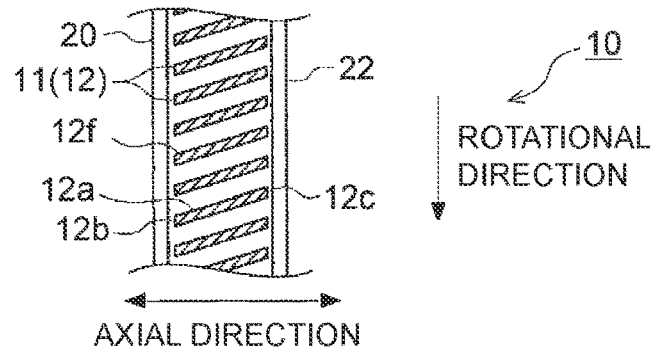
FIG. 6B is a diagram of the seal device in FIG. 6A as seen in the direction of arrow E.
Figure 6C:
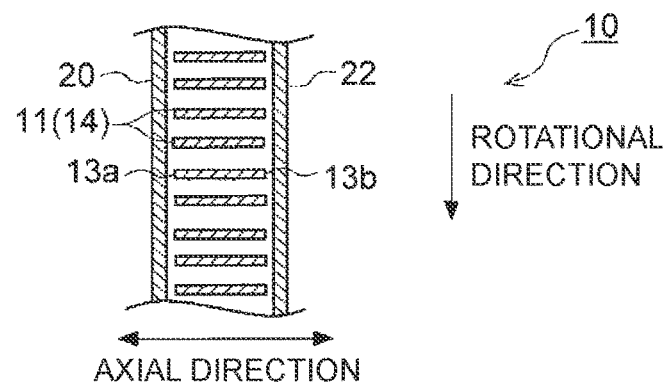
FIG. 6C is a diagram of the seal device in FIG. 6A as seen in the direction of arrow F.
Figure 6D:
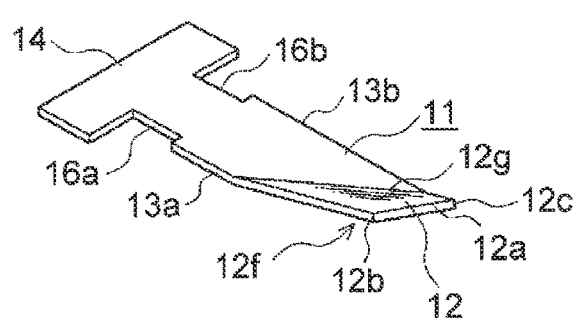
FIG. 6D is a perspective view of the thin plate shown in FIG. 6A.

FIG. 6A is a cross-sectional view of a seal device according to another embodiment. FIG. 6B is a diagram of the seal device in FIG. 6A as seen in the direction of arrow E. FIG. 6C is a diagram of the seal device in FIG. 6A as seen in the direction of arrow F. FIG. 6D is a perspective view of the thin plate shown in FIG. 6A.

In the seal device 10 in another embodiment, each thin plate 11 further includes a bend portion 12f bended at a single flexure line 12g that extends inward in the radial direction toward the low-pressure space 9 from the high-pressure space 8. The flexure line 12g extends linearly from the first side surface 13a on the side of the high-pressure space 8 to the second side surface 13b on the side of the low-pressure space 9. However, configuration of the flexure line 12g is not limited to this. For instance, the flexure line 12g may extend linearly from the first side surface 13a on the side of the high-pressure space 8 to the tip surface 12a between the end portion 12b and the end portion 12c. Further, two or more flexure lines 12g may be provided.

With this configuration, it is not necessary to form a curved surface, and thus the tip portion 12 of the thin plate 11 can be machined easily.

Figure 7A:
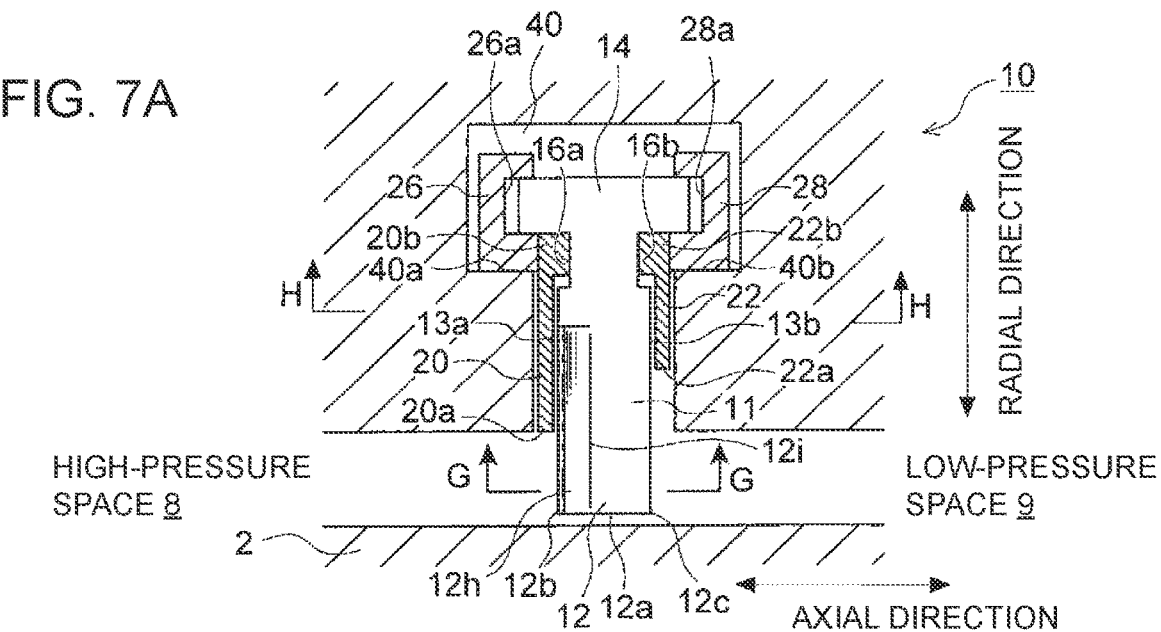
FIG. 7A is a cross-sectional view of a seal device according to another embodiment.
Figure 7B:
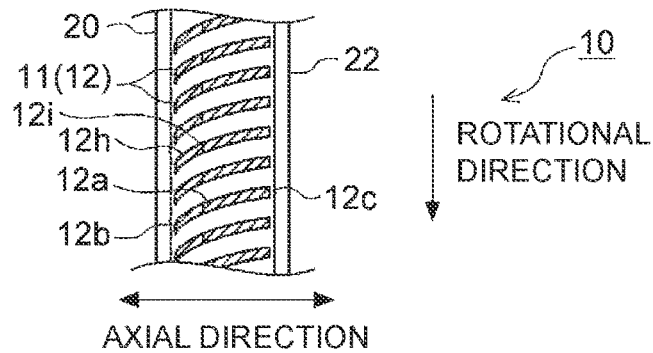
FIG. 7B is a diagram of the seal device in FIG. 7A as seen in the direction of arrow G
Figure 7C:
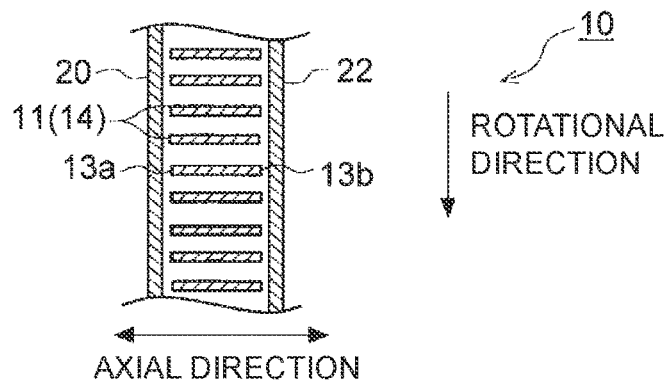
FIG. 7C is a diagram of the seal device in FIG. 7A as seen in the direction of arrow H.
Figure 7D:
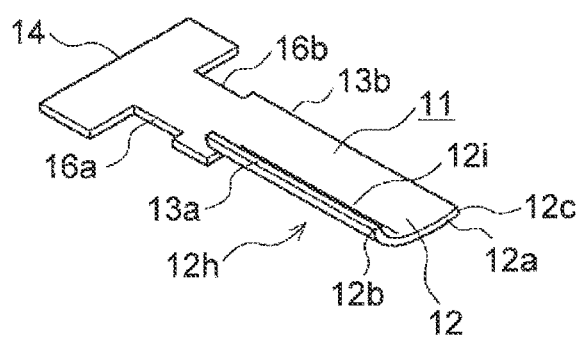
FIG. 7D is a perspective view of the thin plate shown in FIG. 7A.

FIG. 7A is a cross-sectional view of a seal device according to another embodiment. FIG. 7B is a diagram of the seal device in FIG. 7A as seen in the direction of arrow G. FIG. 7C is a diagram of the seal device in FIG. 7A as seen in the direction of arrow H. FIG. 7D is a perspective view of the thin plate shown in FIG. 7A.

In the seal device 10 according to another embodiment, each thin plate 11 further includes a curved portion 12h curved downstream in the rotational direction at the side of the first side surface 13a, across a boundary along a curve start line 12i parallel to the first side surface 13a on the side of the high-pressure space 8. The curve start line 12i extends from the tip surface 12a closer to the tip portion 12 than the root portion 14. That is, there is a region on the side of the root portion 14 where the width direction of the thin plate 11 is parallel to the axial direction, and the curved portion 12h is formed closer to the tip portion 12 than this region.

With this configuration, it is necessary to form a curve only with respect to the width direction of the thin plate 11, and thus the tip portion 12 of the thin plate 11 can be machined relatively easily.

Figure 8A:
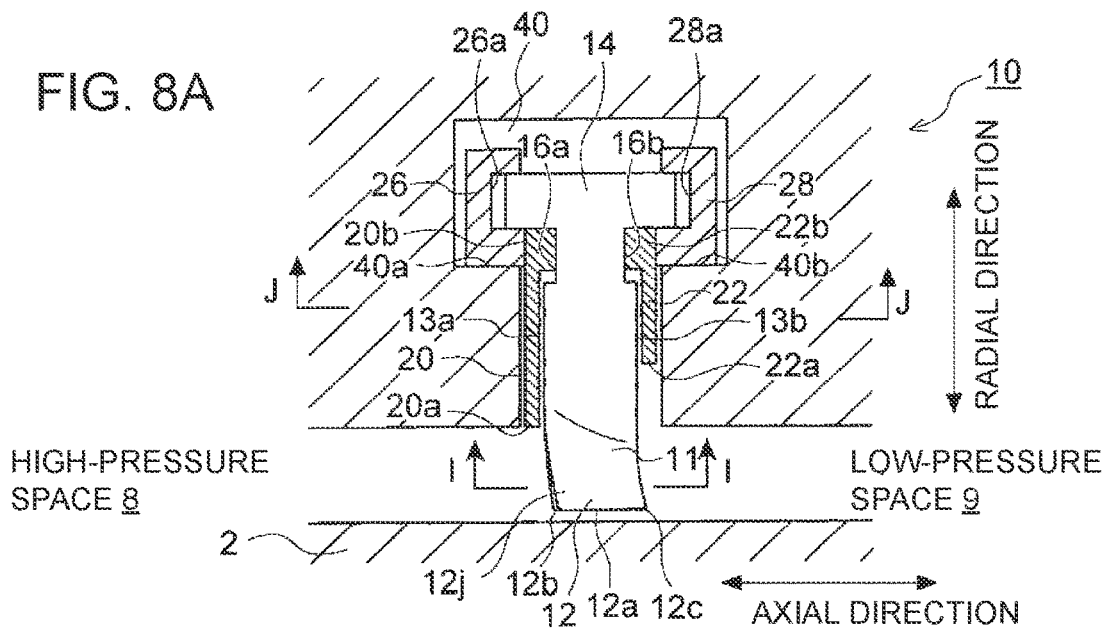
FIG. 8A is a cross-sectional view of a seal device according to another embodiment.
Figure 8B:
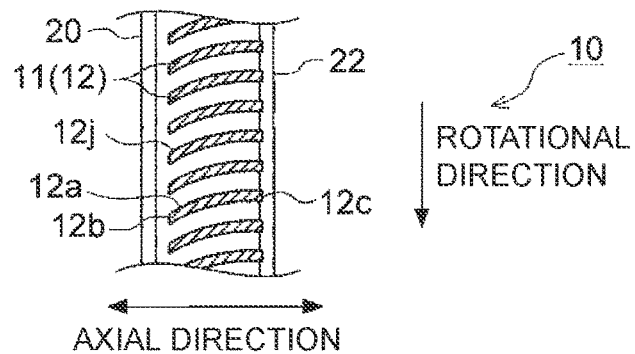
FIG. 8B is a diagram of the seal device in FIG. 8A as seen in the direction of arrow I.
Figure 8C:
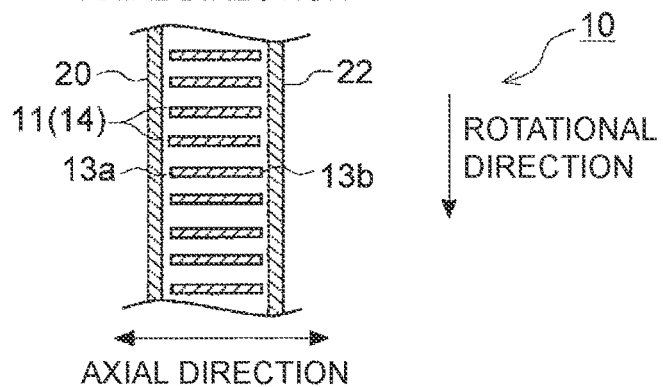
FIG. 8C is a diagram of the seal device in FIG. 8A as seen in the direction of arrow J.
Figure 8D:
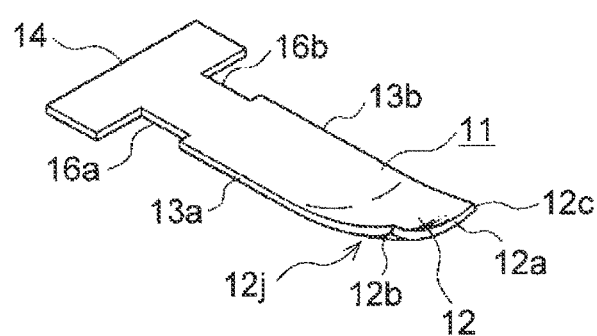
FIG. 8D is a perspective view of the thin plate shown in FIG. 8A.

FIG. 8A is a cross-sectional view of a seal device according to another embodiment. FIG. 8B is a diagram of the seal device in FIG. 8A as seen in the direction of arrow I. FIG. 8C is a diagram of the seal device in FIG. 8A as seen in the direction of arrow J. FIG. 8D is a perspective view of the thin plate shown in FIG. 8A. FIG. 9 is a perspective view of the thin plate shown in FIGS. 8A to 8D.

In the seal device 10 according to another embodiment, each thin plate 11 further includes a distorted portion 12$j$ having a curved shape disposed between the root portion 14 and the tip portion 12 and connecting the root portion 14 and the tip portion 12. In the depicted example, the distorted portion 12$j$ is formed over the entire region from the end portion 12$b$ on the side of the high-pressure space 8 to the end portion 12$c$ on the side of the low-pressure space 9. In this configuration, the end portion 12$c$ on the side of the low-pressure space 9 in the rotational direction is positioned downstream of the second side surface 13$b$ on the side of the root portion 14 in the rotational direction. That is, the second side surface 13$b$ is curved so that the end portion faces downstream on the side of the tip portion 12.

Specifically, as shown in FIG. 9, provided that $\Delta x_1$ is the position offset amount of the thin plate 11 downstream in the rotational direction from the root portion 14 toward the tip portion 12 at the end portion 12$b$ (first position) closest to the high-pressure space 8 in the width direction of the thin plate 11, and $\Delta x_2$ is the position offset amount of the thin plate 11 downstream in the rotational direction from the root portion 14 toward the tip portion 12 at the end portion 12$c$ (second position) closest to the low-pressure space 9 in the width direction of the thin plate 11, each thin plate 11 is configured to satisfy a relationship $\Delta x_1 > \Delta x_2 > 0$. In the drawing, the position offset amount $\Delta x_1$ is the distance to the end portion 12$b$ from the plane M along the side of the root portion 14 of the thin plate 11 (plane region), and the position offset amount $\Delta x_w$ is the distance to the end portion 12$c$ from the plane M.

With this configuration, the tip portion 12 of the thin plate 11 is offset downstream in the rotational direction of the rotor 2 compared to the root portion 14 also on the side of the low-pressure space 9, and thus contact between the thin-plates 11 on the side of the low-pressure space 9 is even more likely to occur.

In this configuration, the position of the end portion 12$c$ on the side of the low-pressure space 9 in the rotational direction is downstream of the position of the second side surface 13$b$ on the side of the root portion 14 in the rotational direction.

In an embodiment, the above described seal device 10 may further include the following configuration.

As shown in FIGS. 4A to 8D, the seal device 10 further includes a pair of retainers 26, 28 that hold the plurality of thin plates 11 at the side of the root portions 14. Further, the first side plate 20 and the second side plate 22 are supported by retainers 26, 28 while being nipped between the retainers 26, 28 and the both side surfaces 13$a$, 13$b$ of the plurality of thin plates 11, respectively.

In a specific configuration, the stator 7 includes an annular holding space 40 formed therein, for holding the retainers 26, 28, the first side plate 20 and the second side plate 22, and the plurality of thin plates 11. The holding space 40 is formed into a T shape in a cross section along the rotational axis O of the rotor 2. The holding space 40 includes a first space 41 formed on the inner peripheral side in the radial direction of the rotor 2 and communicating with the high-pressure space 8 and the low-pressure space 9, and a second space 42 formed on the outer peripheral side in the radial direction of the rotor 2 and communicating with the first space 41.

Each of the thin plates 11 has a substantially T shape, the thickness being greater at the side of the root portion 14 than at the side of the tip portion 12. Cut-out portions 16$a$, 16$b$ having a smaller thickness than the side of the tip portion 12 are disposed on the both side surfaces 13$a$, 13$b$ between the root portion 14 and the tip portion 12.

The pair of retainers 26, 28 have recessed portions 26$a$, 28$a$, respectively, and have a substantially U shape in a cross section including the rotational axis O of the rotor 2. The pair of retainers 26, 28 are accommodated in the second space 42 while the root portions 14 of the thin plates 11 are fit into the recessed portions 26$a$, 28$a$. In other words, the pair of retainers 26, 28 are configured to nip and support the root portions 14 of the plurality of thin plates 11 arranged in a multiple-layered fashion in the circumferential direction of the rotor 2 from the both side surfaces 13$a$, 13$b$. Meanwhile, the side surfaces of the retainers 26, 28 on the side of the rotor 2 are in contact with the wall surfaces 42$a$, 42$b$ of the second space 42 on the side of the rotor 2, and thereby the thin plates 11 held between the retainers 26, 28 are supported on the side of the stator 7.

The first side plate 20 and the second side plate 22 have protruding portions 20$b$, 22$b$ on the outer peripheral side in the radial direction of the rotor 2, respectively. The protruding portions 20$b$, 22$b$ are configured to engage with the cut-out portions 16$a$, 16$b$ of the thin plates 11. Further, the first side plate 20 and the second side plate 22 are supported by retainers 26, 28 while being nipped between the retainers 26, 28 and the both side surfaces 13$a$, 13$b$ of the plurality of thin plates 11.

Although not illustrated, the second space 42 may include a spacer nipped between the retainers 26, 28, for reducing backlash of the thin plates 11 with respect to the retainers 26, 28. Further, the second space 42 may be provided with a plurality of biasing members (e.g. plate springs) for supporting the plurality of thin plates 11 arranged in an annular shape in a levitation state so as to be coaxial with the rotational axis of the rotor 2.

As described above, according to the embodiment of the present invention, the side of the root portion 14 of the thin plate 11 is less affected by the dynamic pressure, while the side of the tip portion 12 levitates easily from the outer peripheral surface of the rotor 2 in response to an influence of the dynamic pressure. Thus, it is possible to realize the non-contact state between the rotor 2 and the thin plate 11 appropriately.

Furthermore, the region of the tip portion 12 on the side of the high-pressure space 8 deforms to distort with respect to the axial direction of the rotor 2 in response to an influence of the dynamic pressure, and thereby the thin plates 11 are more likely to contact each other at the side of the low-pressure space 9. Accordingly, it is possible to suppress oscillation of the thin plates 11 due to flutter.

Embodiments of the present invention were described in detail above, but the present invention is not limited thereto, and various amendments and modifications may be implemented.

Figure 11:
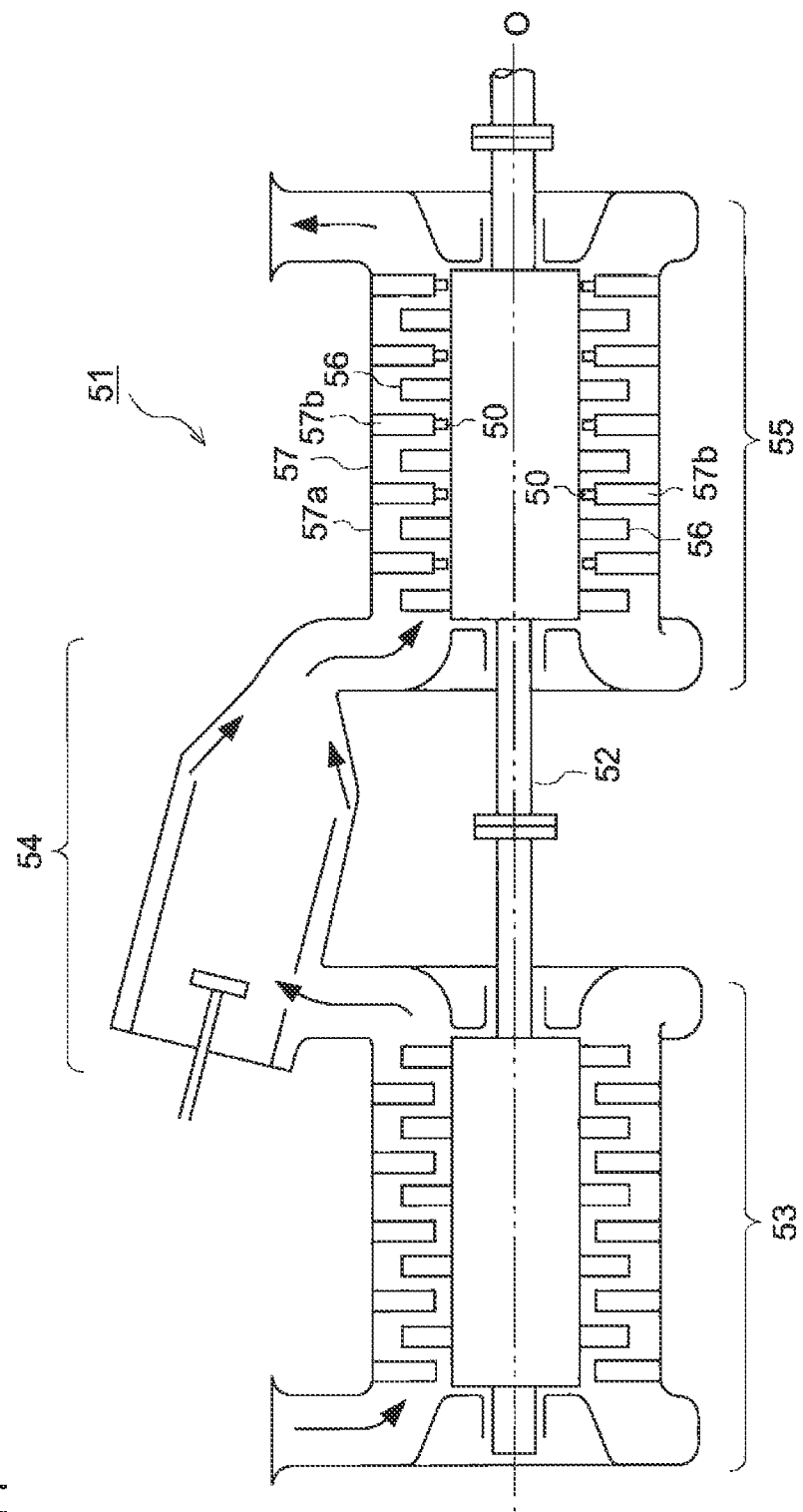
FIG. 11 is a schematic configuration diagram of a gas turbine according to another embodiment.

For instance, while the steam turbine 1 is described as an example of a turbine according to the present embodiment, the turbine according to the present embodiment is not limited to this, and may be another turbine such as the gas turbine 51 shown in FIG. 11.

The gas turbine 51 shown in FIG. 11 includes a compressor 53 for producing compressed air, a combustor 54 for producing combustion gas from the compressed air and fuel, and a turbine 55 configured to be rotary driven by combustion gas. For instance, in the case of the gas turbine 51 for power generation, a generator (not illustrated) is coupled to the turbine 55, so that rotational energy of the turbine 55 generates electric power. The gas turbine 51 of such type uses rotational energy of the turbine 55 as power source of the compressor 53 via the rotor 52 (corresponding to the rotor 2 of FIG. 1).

Specifically, the turbine 55 includes a plurality of rotor blades 56 disposed on the side of the rotor 52 (corresponding to the rotor blades 6 in FIG. 1), a stator (stationary portion) 57 including a casing 57a and a plurality of stationary vanes 57b (corresponding to the stationary vanes 7b in FIG. 1) disposed on the side of the casing 57a, and seal devices 50 disposed on the tips of the stationary vanes 57b. As the above seal device 50, the above described seal device 10 can be used.

The plurality of rotor blades 56 and the plurality of stationary vanes 57b are arranged alternately in the direction of the rotational axis O of the rotor 52 (hereinafter, referred to as the axial direction). The rotor 52 rotates as the combustion gas flowing along the axial direction passes through the rotor blades 56 and the stationary vanes 57b, and rotational energy imparted to the rotor 52 is extracted from the end of the shaft to be utilized for power generation or the like.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

1 Steam turbine
2 Rotor
4 Steam inlet
6 Rotor blade
7 Stator
7a Casing
7b Stationary vane
8 High-pressure space
8b Stationary vane
9 Low-pressure space
10 Seal device
11 Thin plate
11a Upper surface
11b Lower surface
12 Tip portion
12a Thin-plate tip surface
12b End portion on the side of high-pressure space
12c End portion on the side of low-pressure space
12d, 12j Distorted portion
12f Bend portion
12g Flexure line
12h Curved portion
12i Curve start line
12e Curve point
13a First side surface
13b Second side surface
14 Root portion
16a, 16b Cut-out portion
20 First side plate
22 Second side plate
26, 28 Retainer
40 Holding space
51 Gas turbine
52 Rotor
53 Compressor
54 Combustor
55 Turbine
56 Rotor blade
57 Stator
57a Casing
57b Stationary vane
58 High-pressure space
58b Stationary vane
59 Low-pressure space
50 Seal device

The invention claimed is:

1. A seal device for a turbine disposed around a rotor so as to separate a high-pressure space and a low-pressure space, the seal device comprising:
  a plurality of thin plates arranged along an outer peripheral surface of the rotor, each of the thin plates including a root portion which is disposed on an outer side in a radial direction of the rotor and which is supported on a stationary part of the turbine and a tip portion which is disposed on an inner side in the radial direction of the rotor and which has a tip surface facing the outer peripheral surface of the rotor,
  wherein each of the thin plates is arranged such that the root portion of each of the thin plates is parallel to an axial direction of the rotor, and
  wherein the tip portion of each of the thin plates is configured such that an end on a side of the high-pressure space is positioned downstream of another end on a side of the low-pressure side, in a rotational direction of the rotor, in a cross-section taken along a width direction of the thin plate.

2. The seal device for a turbine according to claim 1, wherein each of the thin plates satisfies a relationship $\Delta x_1 > \Delta x_2 > 0$,
  where $\Delta x_1$ is a position offset amount of the thin plate downstream in the rotational direction from the root portion toward the tip portion, at a first position closest to the high-pressure space in the width direction of the thin plate, and $\Delta x_2$ is a position offset amount of the thin plate downstream in the rotational direction from the root portion toward the tip portion, at a second position closest to the low-pressure space in the width direction of the thin plate.

3. The seal device for a turbine according to claim 1, wherein each of the thin plates further includes a distorted portion disposed between the root portion and the tip portion, the distorted portion having a curved shape and connecting the root portion and the tip portion.

4. The seal device for a turbine according to claim 1, wherein each of the thin plates is bended along at least one flexure line extending inward in the radial direction from the side of the high-pressure space toward the side of the low-pressure space.

5. The seal device for a turbine according to claim 1, comprising:
- a first side plate disposed so as to face the high-pressure space and covering outer peripheral regions of first side surfaces, on the side of the high-pressure space, of the plurality of thin plates; and
- a second side plate disposed so as to face the low-pressure space and covering outer peripheral regions of second side surfaces, on the side of the low-pressure space, of the plurality of thin plates,
- wherein the first side surface of each of the thin plates is covered with the first side plate in a region extending further to an inner side, in the radial direction of the rotor, than a region of the second side surface covered with the second side plate.

6. The seal device for a turbine according to claim 5,
- wherein a radial-directional position of the tip surface of each of the thin plates has a such a distribution that the side of the high-pressure space is further away from the outer peripheral surface of the rotor than the side of the low-pressure space in the axial direction of the rotor, and the radial-directional position of the tip surface of the thin plate at an axial-directional position closest to the high-pressure space is disposed on an inner side of an inner peripheral edge of the second side plate in the radial direction.

7. The seal device for a turbine according to claim 5, further comprising a retainer configured to hold a side of the root portion of the plurality of thin plates,
- wherein the first side plate and the second side plate are supported by the retainer while being nipped between the retainer and a corresponding one of both side surfaces of the plurality of thin plates.

8. A turbine, comprising:
- a rotor having a turbine blade; and
- the seal device for a turbine according to claim 1 disposed around the rotor so as to separate an annular space around the rotor into a high-pressure space and a low-pressure space.

9. A thin plate for the seal device for a turbine according to claim 1.

* * * * *